Dec. 30, 1958
A. P. PRINC
2,866,891
AUTOMOBILE AND PORTABLE RADIO MOUNTING
Filed Aug. 30, 1954
2 Sheets-Sheet 1
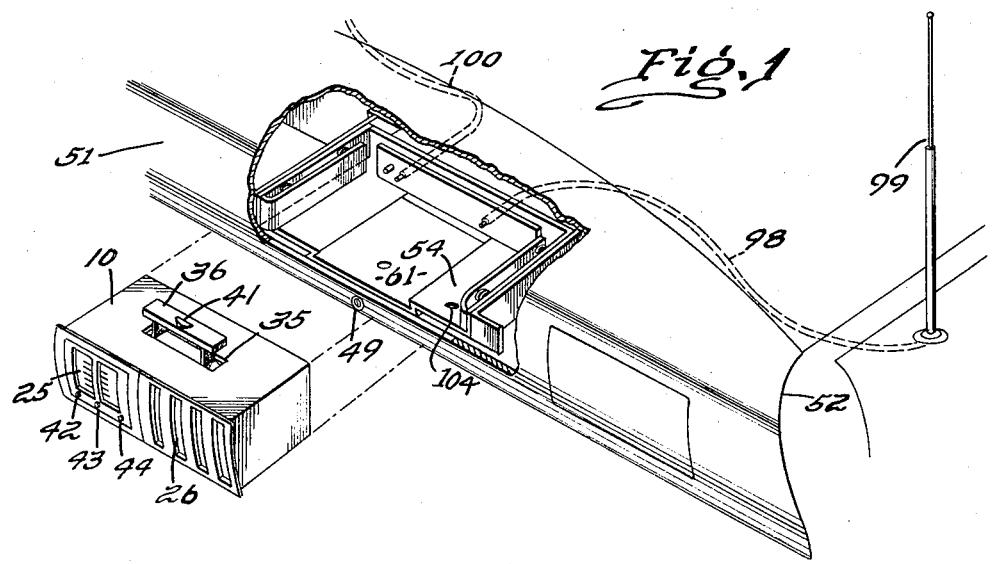
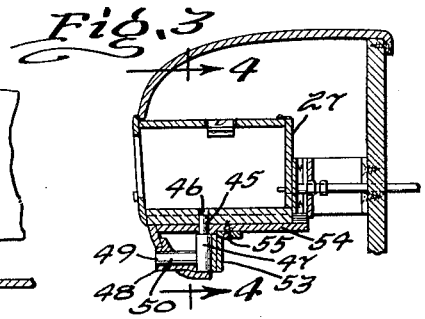
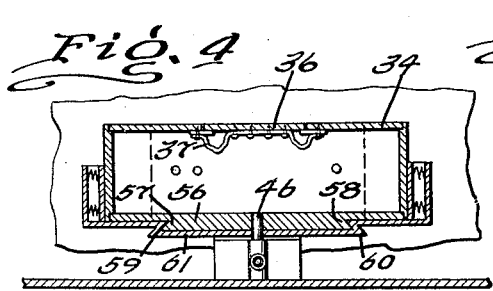
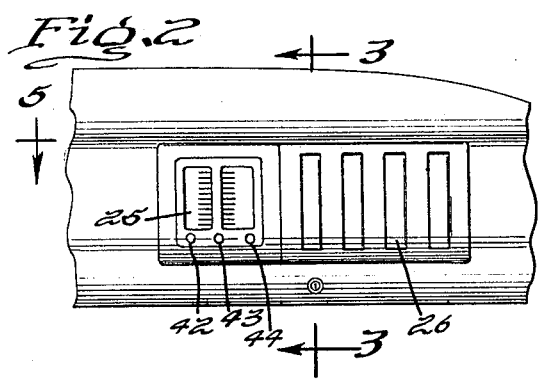
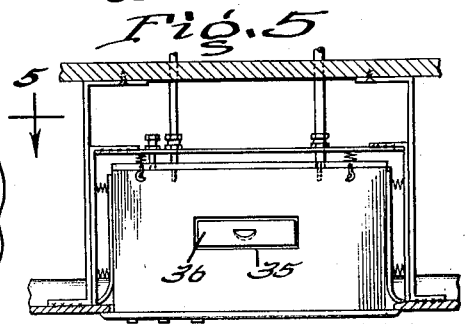
INVENTOR.
*Anthony P. Princ*
BY *Victor J. Evans & Co.*
ATTORNEYS

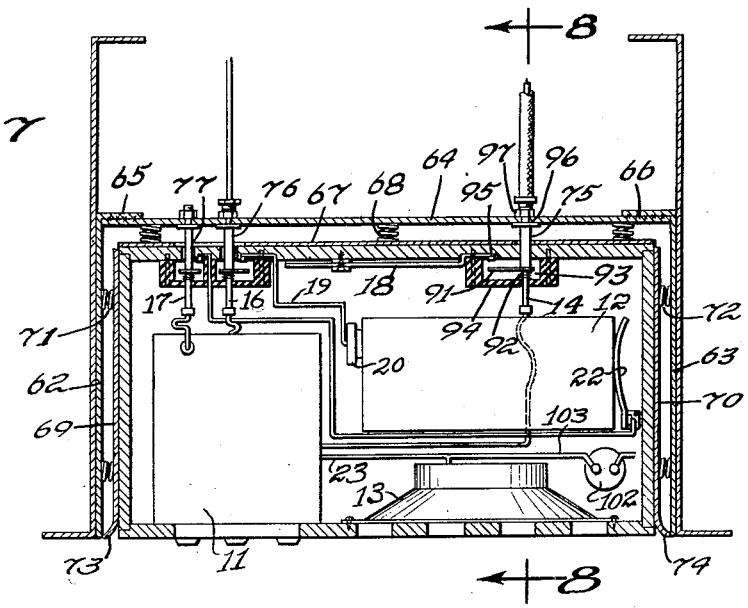
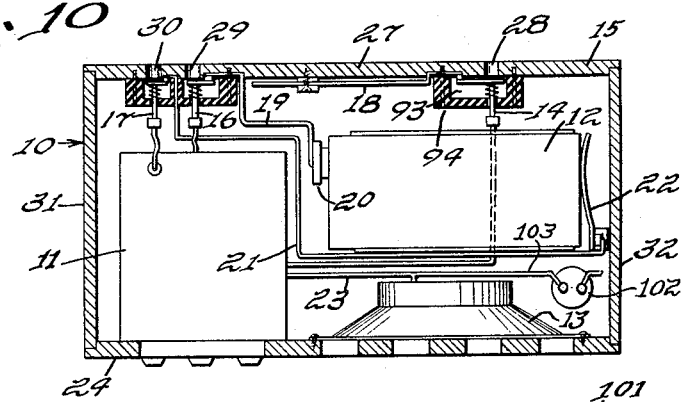
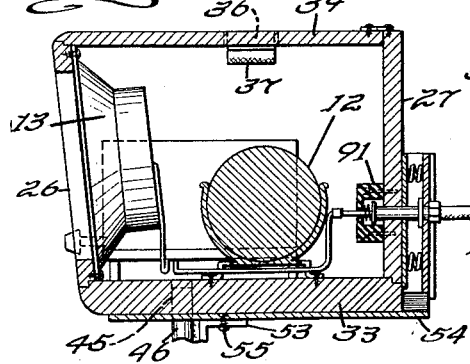
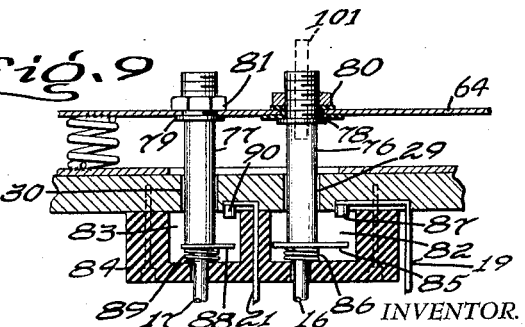

United States Patent Office 2,866,891
Patented Dec. 30, 1958

2,866,891
AUTOMOBILE AND PORTABLE RADIO MOUNTING

Anthony P. Princ, North Chicago, Ill.

Application August 30, 1954, Serial No. 452,882

1 Claim. (Cl. 250—14)

This invention relates to mounting devices particularly adapted for retaining portable objects in pockets in machines and structures, and in particular, a mounting for temporarily retaining a radio in a pocket in an instrument panel of a motor vehicle whereby the radio is adapted to be connected to the battery of the vehicle when positioned in the pocket of the instrument panel and wherein the radio is adapted to be operated with self-contained batteries and antennas when removed from the instrument panel of the vehicle.

The purpose of this invention is to make it possible to remove a radio from a motor vehicle so that the radio may be used on outings and particularly for picnics and while fishing.

In numerous instances it is necessary to carry a portable radio in a motor vehicle particularly to receive a program or music while reclining or eating on an outing and as the conventional vehicle radio is not removable at least two radios are carried in the vehicle. With this thought in mind, this invention contemplates a portable radio is not removable at least two radios are carried in the vehicle. With this thought in mind, this invention contemplates a portable radio and a mounting therefor in which latching means is provided for making a connection to a battery of the vehicle with the radio in the mounting, which may be positioned in a pocket in the instrument panel of the vehicle, and in which, upon removing the radio, the connections to the battery and antenna of the vehicle are broken and connections are instantly made to a battery and a built-in antenna within the radio.

The object of this invention is, therefore, to provide means for forming a mounting for a radio wherein with the mounting positioned in an instrument panel of a motor vehicle a radio inserted therein is adapted to be connected to operative parts of the vehicle and wherein upon removing the radio from the mounting the radio is adapted to be used independently of the vehicle.

Another object of the invention is to provide a mounting for receiving a radio in an instrument panel of a motor vehicle wherein it is only necessary to insert the radio in the mounting to make connections to the battery and antenna of the vehicle.

Another object of the invention is to provide a mounting for a portable radio wherein a radio may be positioned in a pocket in a motor vehicle or removed from the pocket and used independently thereof in which means is provided for locking the radio in the pocket.

A further object of the invention is to provide a mounting for temporarily retaining a portable radio in a pocket in an instrument panel of a motor vehicle in which the mounting is of a simple and economical construction.

With these and other objects and advantages in view, the invention embodies a substantially rectangular-shaped casing having an open front and having resilient positioning and contact elements therein with one of the contacts adapted to be connected to an antenna of the vehicle and another to the battery of the vehicle, and a portable radio having a battery and a built-in antenna and also having converting means whereby upon inserting the portable radio in the mounting of the vehicle connections are made instantly to the battery and antenna of the vehicle.

Other features and advantages of the invention will appear from the following description taken in connection with the drawings, wherein:

Figure 1 is a perspective view showing a portion of an instrument panel of a motor vehicle with parts broken away showing a casing for receiving a portable radio and with a portable radio adapted to be positioned in the mounting extended forwardly from the instrument panel.

Figure 2 is a view showing a front elevation of the panel with a radio positioned therein.

Figure 3 is a cross section through a radio housing and a mounting therefor, said section being taken on line 3—3 of Figure 2.

Figure 4 is a longitudinal section through a radio mounting positioned in the instrument panel of a vehicle taken on line 4—4 of Figure 3 showing, in particular, a handle nested in the upper surface of a radio positioned in the mounting and also showing a locking pin extended upwardly into the lower surface of the radio casing.

Figure 5 is a sectional plan through the mounting taken on line 5—5 of Figure 2 and in which parts are broken away.

Figure 6 is a detail showing a longitudinal section through the upper wall of the radio cabinet illustrating a mounting of a handle in an opening through the wall.

Figure 7 is a sectional plan through the radio and mounting, with the parts shown on an enlarged scale, and illustrating the positions of the parts with a terminal connected to the battery of the vehicle and with another terminal connected to the antenna of the vehicle.

Figure 8 is a cross section through the radio and mounting therefor, also with the parts shown on an enlarged scale and taken on line 8—8 of Figure 7.

Figure 9 is a detail showing a section at the rear of the pocket or cabinet also with the parts shown on an enlarged scale and illustrating the mounting of the conversion elements whereby the radio is changed from a portable radio to a radio installed in and connected to operative elements of a vehicle.

Figure 10 is a sectional plan through the radio with the mounting elements removed whereby the radio is adapted to be used independently of the vehicle.

Referring now to the drawings, wherein like reference characters denote corresponding parts, the improved combination portable and motor vehicle radio of this invention includes a case 10, a power unit 11 positioned in one end of the case, a battery 12 also positioned in the case, a loud speaker 13 also positioned in the case, a terminal 14 adapted to provide a connection to an antenna positioned on the inside of the back 15 of the case, a terminal 16 adapted to provide a connection to the battery of a vehicle in which the radio is positioned and a connection 17 adapted to be grounded in the frame or chassis of the vehicle, one terminal of the battery of the vehicle also being grounded.

The radio, as shown particularly in Figure 10, is self-contained having a built-in antenna 18 to which the terminal 14 is connected, a connection 19 extended from the terminal 16 to a contact 20 of the battery 12, a connection 21 extended from the ground terminal 17 to a contact 22 at the opposite end of the battery 12, and a connection 23 from the power unit 11 to the loud speaker 13.

The radio case 10 is provided with a front wall 24 having a dial opening 25 in one end and open louvers 26 positioned to register with the loud speaker in the opposite end, a rear wall 27 having an opening 28 for the terminal 14, an opening 29 for the terminal 16, and an opening 30 for the terminal 17, end walls 31 and 32, a base 33 and a cover 34.

The cover 34 is provided with a centrally disposed opening 35 in which a strip of material providing a handle 36 is positioned and, as illustrated in Figure 6, the handle is secured to a flexible strip 37 with fastening elements 38 and the ends of the flexible strip are secured to the under surface of the cover 34 with fastening elements 39 and 40. The intermediate part of the handle 36 is provided with a recess 41 to facilitate removing the handle from the opening 35. The radio is also provided with conventional knobs, as indicated by the numerals 42, 43 and 44.

The base or bottom 33 of the case or cabinet 10 is provided with an opening 45 into which a lock bolt 46 is adapted to extend, as shown in Figures 3 and 4 to provide means for locking the radio in the pocket of the instrument panel of the vehicle.

The lock bolt 46 extends from a cylinder 47 of a cylinder lock 48 that is adapted to be actuated by a key positioned in a key slot in the end 49 of the cylinder. The cylinder 48 is positioned in an opening 50 in a front wall 51 of an instrument panel 52 of a vehicle and the cylinder 47 which is integral with the inner end of the cylinder 48 is mounted on a clip angle 53 extended downwardly from a bottom 54 of a radio mounting with a fastener, such as a screw 55. By this means the case 10, including the radio elements, is adapted to be locked in the instrument board and may be removed only after the lock is actuated by a key, such as the key of the vehicle.

The base 33 of the case or cabinet 10 is provided with a relatively wide tongue 56 having dove-tail edges 57 and 58 that are adapted to slide in corresponding edges 59 and 60 of a wide slot 61 in the base 54 of the mounting.

The mounting is provided with end walls 62 and 63 and a rear wall 64 that is held by flanges 65 and 66 of the end walls 62 and 63, respectively, and, as illustrated particularly in Figure 7, a floating panel 67 is spaced from the rear wall 64 and resiliently urged inwardly by springs 68 positioned between the panel 67 and the wall 64. Similar floating panels 69 and 70 are spaced from the end walls 62 and 63 and these panels are urged by springs 71 and 72, respectively, against the end walls 31 and 32 of the case 10. The extended ends of the panels 69 and 70 are provided with arcuate surfaces 73 and 74, respectively, and the panel 67, at the rear, is urged against the rear wall 27 of the case 10 by the springs 68.

The terminals 14, 16 and 17 for the antenna, battery, and ground of the radio in the case 10 are positioned to be engaged by prongs 75, 76, and 77 mounted in the wall 64 and positioned to extend through openings 28, 29 and 30 as the case 10 is moved into the mounting elements. The mounting of the terminals and prongs is similar and the mounting of the terminals 16 and 17 and the prongs 76 and 77 is illustrated in detail in Figure 9 wherein the prongs are secured by collars 78 and 79 in the wall 64 with nuts 80 and 81 threaded on the extended ends of the prongs and providing clamping means for securing the collars and prongs in the wall 64.

The contact elements are positioned in cavities 82 and 83 in a block 84 of insulating material, the terminal 16 being provided with a contact plate 85 that is urged by a spring 86 against a contact 87 on the end of the connection 19 whereby with the prong 76 removed from the opening 29 the plate 85 provides a cover for the opening and, at the same time, connects the terminal 87 to the terminal 16.

A similar contact plate 88 is carried by the terminal 17 and the plate 88 which is urged inwardly by a spring 89 is positioned to engage a contact 90 at the end of the connection 21. Also, as illustrated in Figures 8 and 10, a contact plate 91 on the end of the terminal 14 is urged inwardly by a spring 92 in a cavity 93 of a block 94 of insulating material whereby the plate 91 is adapted to engage a contact 95 of the built-in antenna 18. The prong 75 is secured in the wall 64 with a collar 96 and a nut 97, similar to the collars and nuts of the prongs 76 and 77.

With the parts arranged as disclosed and described, the contact plates 91, 85 and 88 complete circuits to provide a self-contained radio in the case 10 with the radio removed from the pocket or mounting in the instrument panel; and as the case 10 is inserted in the opening in the instrument panel, the prongs 75, 76 and 77 extend through the openings 28, 29 and 30 in the rear wall 27 of the case, breaking the contacts to the antenna, battery, and ground of the case and completing contacts to corresponding parts of the vehicle in which the mounting is positioned.

The radio is, therefore, adapted to use the antenna and battery of the vehicle, when positioned in the pocket or mounting in the instrument panel of the vehicle, and when removed from the instrument panel, it is adapted to use a battery and an antenna positioned within the case thereof.

As illustrated in Figure 1, the pocket or mounting is adapted to be positioned in an opening in the wall 51 of the instrument panel 52, and the terminal or prong 75 is adapted to be connected by a wire 98 to an antenna 99 positioned on the vehicle and the terminal or prong 76 by a wire 100 to a battery of the vehicle.

The combination portable and vehicle radio of this invention is, therefore, adapted to be used in a motor vehicle and installed in the instrument panel thereof with the power unit connected to the antenna, battery and a ground of the vehicle, or the entire case in which the radio is mounted is adapted to be withdrawn from the instrument panel and used independently as a portable radio. Upon withdrawing the case or cabinet of the radio from the instrument panel, connections to the antenna, battery and ground of the chassis of the vehicle are broken and connections completed to a built-in antenna, a battery and a ground of the case or cabinet of the radio. Upon return of the portable radio to the pocket or mounting in the instrument panel, the prongs enter the openings in the case whereby the connectors of the antenna, battery and ground are actuated to break the connections of these elements in the case and by the same means connections are made to the antenna, battery and a ground of the chassis.

The spring-held floating panels retain the radio case in a fixed position and the tongue 56 with the beveled edges prevents lateral movement of the case in the pocket or mounting.

The rear wall or door 27 is adapted to be readily opened to provide access to the interior of the radio to facilitate making repairs or replacing a battery.

The connections at the base of the prong 76, including the collar 78 and the nut 80 are formed to provide a socket for a conventional auto radio fuse, as indicated by the numeral 101.

The radio is also provided with a female electric socket 102 connected with a wire 103 to the wire 23, and a male plug of an electric cord of a loud speaker positioned adjacent the rear seat of a vehicle may be plugged into the socket 102 through an opening 104 in the bottom 54 of the radio mounting.

It will be understood that modifications, within the scope of the appended claims, may be made in the design and arrangement of the parts without departing from the spirit of the invention.

What is claimed is:

A mounting for a radio for use either as a vehicle radio or as a portable radio, said radio including a power unit, battery, built-in antenna, and a speaker, said speaker adapted to be used when the radio is inside or outside a vehicle, said radio further including a case provided with spaced openings in a wall thereof, said mounting being positioned in an instrument panel of said vehicle and comprising a base with spring actuated panels at the ends and on one side thereof which engage end and rear surfaces respectively of said case when said radio is held by said mounting, the spring actuated panels retaining the radio case in a fixed position when in the vehicle so as to prevent accidental shifting movement of the case when mounted in the vehicle, terminals within said case disposed in one of two positions and electrically contacting the battery, built-in antenna and ground of said radio when in one position, spring members contiguous to said terminals, prongs electrically connected to a battery, antenna and ground of said vehicle and positioned to selectively enter the spaced openings of said case, said terminals electrically contacting said prongs when in a second position, said prongs serving to disconnect the power unit from the battery, built-in antenna and ground of said radio and to connect said power unit to the battery, antenna and ground of said vehicle when the radio is mounted in said vehicle, means for locking the radio in the vehicle whereby the radio can be held in said vehicle instrument panel, and wherein unauthorized removal of the radio from the vehicle is prevented, a handle positioned in a recess in the case of the radio, and said radio requiring no outside source of electrical energy when being used outside of a vehicle, and whereby upon withdrawing the case from said vehicle instrument panel, the connections to the antenna, battery and ground of the vehicle are broken, and at the same time connections are automatically completed to the built-in antenna, battery and ground of the case of the radio, and whereby upon return of the radio to the mounting in the vehicle instrument panel, the prongs enter the openings in the case.

References Cited in the file of this patent

UNITED STATES PATENTS

| | | |
|---|---|---|
| 294,560 | Woodrick et al. | Mar. 4, 1884 |
| 804,884 | Rutan | Nov. 21, 1905 |
| 925,507 | Ridick | June 22, 1909 |
| 2,077,284 | Te Pas | Apr. 13, 1937 |
| 2,280,465 | Barrett et al. | Apr. 21, 1942 |
| 2,396,121 | Patino | Mar. 5, 1946 |
| 2,662,975 | Schwarz | Dec. 15, 1953 |

FOREIGN PATENTS

| | | |
|---|---|---|
| 726,176 | France | Feb. 23, 1932 |